(12) United States Patent  (10) Patent No.: US 7,796,370 B1
Wruble  (45) Date of Patent: Sep. 14, 2010

(54) APPARATUS AND METHOD FOR LIGHTNING SENSOR AND CONTROLLER

(75) Inventor: John Michael Wruble, Renton, WA (US)

(73) Assignee: Alset Corporation, Seattle, WA (US)

( * ) Notice: Subject to any disclaimer, the term of this patent is extended or adjusted under 35 U.S.C. 154(b) by 661 days.

(21) Appl. No.: 11/694,897

(22) Filed: Mar. 30, 2007

Related U.S. Application Data

(60) Provisional application No. 60/790,277, filed on Apr. 7, 2006.

(51) Int. Cl.
*H02H 1/00* (2006.01)

(52) U.S. Cl. .................. 361/212; 361/111; 361/117; 361/118; 361/216

(58) Field of Classification Search .............. 361/56, 361/111, 117, 118, 212, 216–218; 324/72, 324/457; 340/507, 525, 601
See application file for complete search history.

(56) References Cited

U.S. PATENT DOCUMENTS

| | | | | |
|---|---|---|---|---|
| 3,891,919 | A | * | 6/1975 | Penninger .................... 324/72 |
| 4,091,326 | A | * | 5/1978 | Hill ............................ 324/72 |
| 4,115,732 | A | | 9/1978 | Krider et al. |
| 4,245,190 | A | * | 1/1981 | Krider et al. .................... 324/72 |
| 4,383,260 | A | * | 5/1983 | Ryan ........................... 343/701 |
| 4,506,211 | A | * | 3/1985 | Coleman ...................... 324/72 |
| 4,525,863 | A | | 6/1985 | Stites |
| 4,631,473 | A | * | 12/1986 | Honda ....................... 324/72.5 |
| 4,716,371 | A | * | 12/1987 | Blitshteyn et al. ........... 324/457 |
| 4,823,115 | A | | 4/1989 | McCallie |
| 4,987,391 | A | | 1/1991 | Kusiak, Jr. |
| 5,291,208 | A | | 3/1994 | Young |
| 5,453,899 | A | | 9/1995 | Page |
| 5,521,603 | A | | 5/1996 | Young |
| 5,721,659 | A | | 2/1998 | Young |
| 5,784,241 | A | * | 7/1998 | Munch et al. ................ 361/111 |
| 5,923,516 | A | | 7/1999 | Young |
| 5,973,898 | A | | 10/1999 | Merchant et al. |
| 5,977,762 | A | | 11/1999 | Murtha, Jr. et al. |
| 6,038,118 | A | | 3/2000 | Guerra |
| 6,586,920 | B1 | | 7/2003 | Hirakawa et al. |
| 6,700,385 | B2 | * | 3/2004 | Kraz .......................... 324/457 |
| 6,960,995 | B2 | | 11/2005 | Parker et al. |
| 2003/0117817 | A1 | | 6/2003 | Turvey et al. |

\* cited by examiner

*Primary Examiner*—Jared J Fureman
*Assistant Examiner*—Terrence R Willoughby
(74) *Attorney, Agent, or Firm*—Frommer Lawrence & Haug LLP; Matthew M. Gaffney

(57) ABSTRACT

A lightning protection device is provided. The device includes a lower field coupler, an upper field coupler, a lightning sensor, and a controller. The lightning sensor includes a differential voltage window comparator. The lower field coupler is capacitively coupled to the earth ground, and the upper field coupler is coupled to the local atmospheric electric field. If a ground potential rise (GPR) event occurs, the differential voltage window comparator trips. If the differential voltage window comparator trips or if a power line transient occurs, the controller disconnects the power phase, neutral, and ground wires to isolate sensitive equipment. In some embodiments, the controller also detects power line transients and disconnects the power, phase, neutral, and ground wires if a power line transient is detected.

24 Claims, 5 Drawing Sheets

APPARATUS AND METHOD FOR LIGHTNING SENSOR AND CONTROLLER

CROSS-REFERENCE TO RELATED APPLICATION

This application claims the benefit of U.S. Provisional Patent Application 60/790,277 filed Apr. 7, 2006, the benefit of the earlier filing date of which is hereby claimed under 35 U.S.C. §119(e) and which is further incorporated by reference.

FIELD OF THE INVENTION

The invention is related to surge protection devices, and in particular, to an apparatus and method for detecting a ground potential rise and other threat conditions and isolating sensitive equipment for the duration of the threat.

BRIEF DESCRIPTION OF THE DRAWINGS

Non-limiting and non-exhaustive embodiments of the present invention are described with reference to the following drawings, in which.

DETAILED DESCRIPTION

Figure 1:
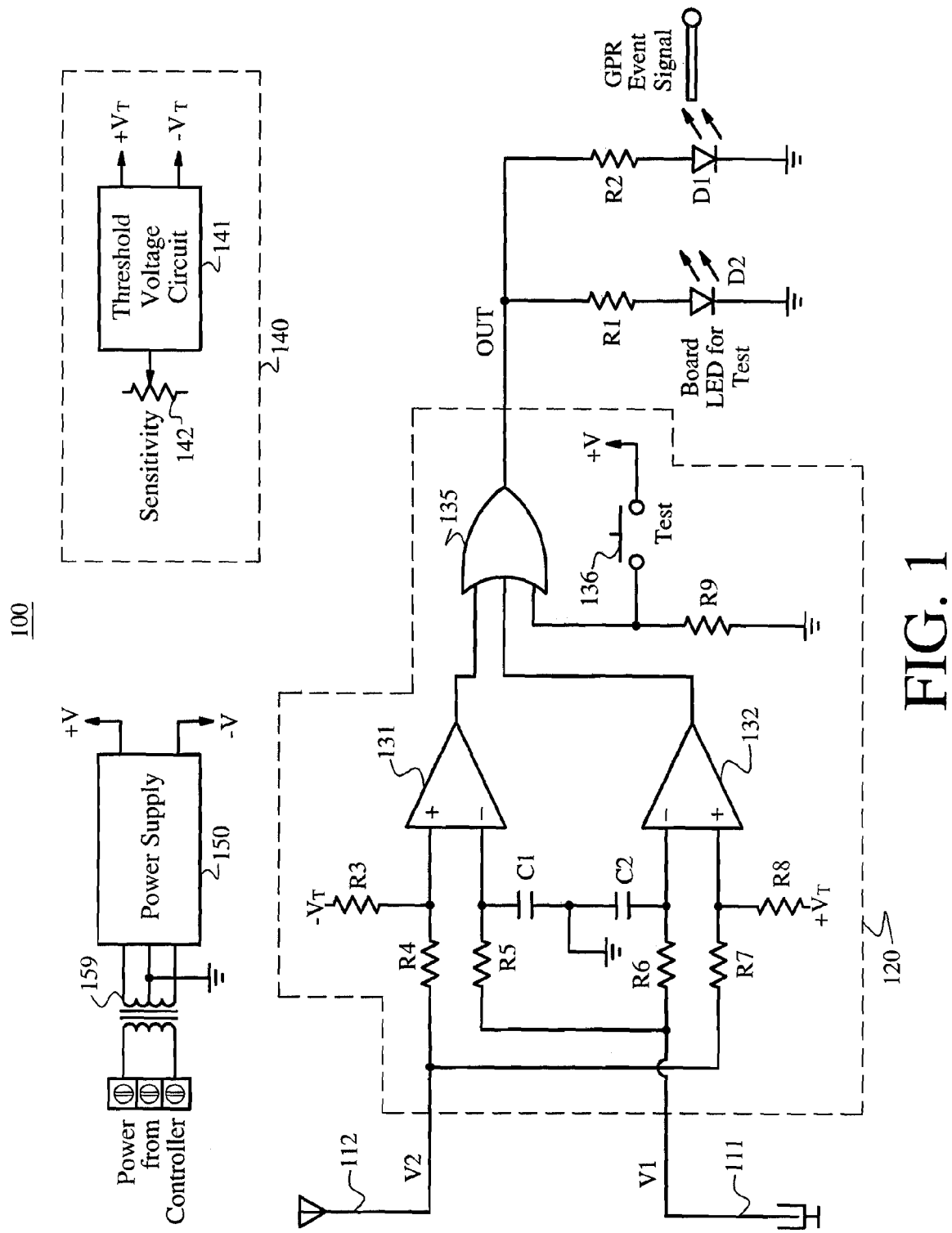
FIG. 1 illustrates a block diagram of an embodiment of a lightning sensor.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar transistor may be employed as an embodiment of a transistor, the scope of the words "gate", "drain", and "source" includes "base", "collector", and "emitter", respectively, and vice versa.

Briefly stated, the invention is related to a lightning protection device. The device includes a lower field coupler, an upper field coupler, a lightning sensor, and a controller. The lightning sensor includes a differential voltage window comparator. The lower field coupler is capacitively coupled to the earth ground, and the upper field coupler is coupled to the local atmospheric electric field. If a ground potential rise (GPR) event occurs, the differential voltage window comparator trips. If the differential voltage window comparator trips, the controller disconnects the power phase, neutral, and ground wires to isolate sensitive equipment. In some embodiments, the controller also detects power line transients and disconnects the power, phase, neutral, and ground wires if a power line transient is detected.

FIG. 1 illustrates a block diagram of lightning shield sensor 100. In one embodiment, sensor 100 includes power supply 150, transformer 159, block 140, lower field coupler 111, upper field coupler 112, differential voltage window comparator 120, resistor R1, LED D1, and LED D2. Block 140 includes threshold voltage circuit 140 and potentiometer 142. Differential voltage window comparator 120 includes comparator 131, comparator 132, resistors R3-R9, OR gate 135, switch 136, capacitor C1, and capacitor C2.

Sensor 100 is arranged to detect electrical potential differences in a vertical orientation near the earth. If mounted in free space just above the earth it is detecting electrostatic fields created by charge build up from an overhead storm cloud. If the lower coupler 111 is coupled to the earth it will also pick up electrostatic waves propagated through the earth by remote lightning or downed power phase lines. Both electrostatic fields can be considered Ground Potential Rise (GPR) events.

In one embodiment, upper field coupler 112 and lower field coupler 111 each have a relatively large surface area assisting in the electrostatic field pickup. However, in other embodiments, other geometries may be use for the field couplers that are not based on maximizing surface area. In one embodiment, field couplers 111 and 112 are mounted vertically to align with the electro-static field present when an electrified storm cloud shadow is present. Also, in one embodiment, a conductive sleeve that fits over lower field coupler 111 and capacitively couples to lower field coupler 111 is installed and grounded to earth to condition the pickup of GPR signals. The couplers can be easily replaced with various designs so as to accommodate varied and specific applications.

Differential voltage window comparator 120 includes voltage comparators 131 and 132, which are connected in a way to detect either polarity of electrostatic fields. Though most lightning events are characterized by a negatively charged storm cloud and a positive charged earth, opposite polarities are also detected by sensor 100 in one embodiment. By detecting electrostatic fields, sensor 100 allows for detection prior to a lightning stroke channel formation in sufficient time to protect equipment through power line isolation. Detection of electrostatic waves propagated through the earth creates ground potential rises that are also detected by sensor 100. The coupling of the lower coupler 111 to the earth allows for sufficient sensitivity to detect cloud to earth lightning events as far as 40 miles away.

Detection of an advancing storm front by sensor 100 provides advance notice to protect equipment through power line isolation.

Block 140 allows for sensitivity adjustment in sensor 100 for reducing the range of detection to keep unnecessary isolation from occurring. The sensitivity adjustment in one embodiment is a change to the voltage threshold to comparators 131 and 132. This way, block 140 allows for both sides of the "voltage window" to be adjusted by adjusting the trip point of each of the corresponding comparators 131 and 132. In one embodiment, as shown in FIG. 1, threshold voltage circuit 140 allows both threshold voltages to be changed with one adjustment component, so that the adjustment to the voltage window is symmetrical. In another embodiment, more than one adjustment component may be used, so that asymmetrical adjustments to the voltage window can be made.

In one embodiment, block 140 is configured such that threshold voltage $V_T$ is user-adjustable from zero volts to five volts.

In differential voltage window comparator 120, a low pass filter (including resistor R5, resistor R6, capacitor C1, and capacitor C2 in one embodiment) is used at the voltage comparator inputs to reduce the effects of local man-made electric fields such as those generated by RF equipment.

Field coupler 111 is arranged to capacitively couple earth ground to provide voltage V1 to one input of differential voltage window comparator 120, and field coupler 112 is arranged to couple the ambient atmospheric electric field to provide voltage V2 at another input of differential voltage window comparator 120. Disregarding test mode and the effects of the low-pass filter, differential voltage window comparator 120 is arranged to provide signal OUT such that signal OUT is asserted if the differential voltage V2−V1 is outside of the voltage window defined by $V_T$ and $-V_T$, and de-asserted otherwise. Under normal conditions, V1 and V2 are both about zero volts. A voltage difference V2−V1 of about 1V or more may be indicative of a potentially dangerous GPR event.

Although one particular embodiment of differential voltage window comparator 120 is shown in FIG. 1, many other embodiments of differential voltage window comparator 120 are within the scope and spirit of the invention. Various embodiments of differential voltage window comparator 120 may include more or less components than illustrated in FIG. 1. For example, in one embodiment, although not shown in FIG. 1, op amps may be included in front of comparators 131 and 132 for the purposes of pre-amplification, filtering, and/or the like.

In one embodiment, as shown in FIG. 1, signal OUT drives LED D1, which is transmitted to the controller circuit via a fiber optic cable. This provides electrical isolation between the sensor and the controller. In one embodiment, the power for sensor 100 is provided by a low voltage 60 Hz AC signal coming from the controller. In one embodiment, the power is transformer-coupled on both ends to continue to provide electrical isolation.

Although LED D1 is used to optically couple information about a GPR event to the controller in one embodiment, in other embodiments, the information may be coupled to the controller in another manner, such as electrically through a transformer, or the like.

In one embodiment, a test switch (136) is provided in the sensor enclosure to allow end user system test functionality. Also, in one embodiment, as shown in FIG. 1, LED D2 is used on the sensor circuit board to indicate detection or test activation, as a trouble-shooting aid. Test switch 136, LED D2 and resistor R1 are optional components that need not be included in sensor 100. Also, in other embodiments, the test switch or test switches may be in different places than shown in FIG. 1.

Sensor 100 may be used to detect lightning before a stroke channel occurs in time to protect equipment. In conjunction with a controller (such as controller 205 of FIG. 2, discussed in greater detail below), sensor 100 may be used to protect equipment from damaging GPR conditions caused by lightning, and to protect equipment from damaging GPR conditions caused by downed power lines. In one embodiment, no battery is needed by sensor 100. In one embodiment, sensor 100 may be used for both positive and negative stroke detection. However, the invention is not so limited, and in other embodiments, sensor 100 may also used to detect negative strokes only or positive strokes only. In one embodiment, field couplers 111 and 112 are field-replaceable.

Figure 2:
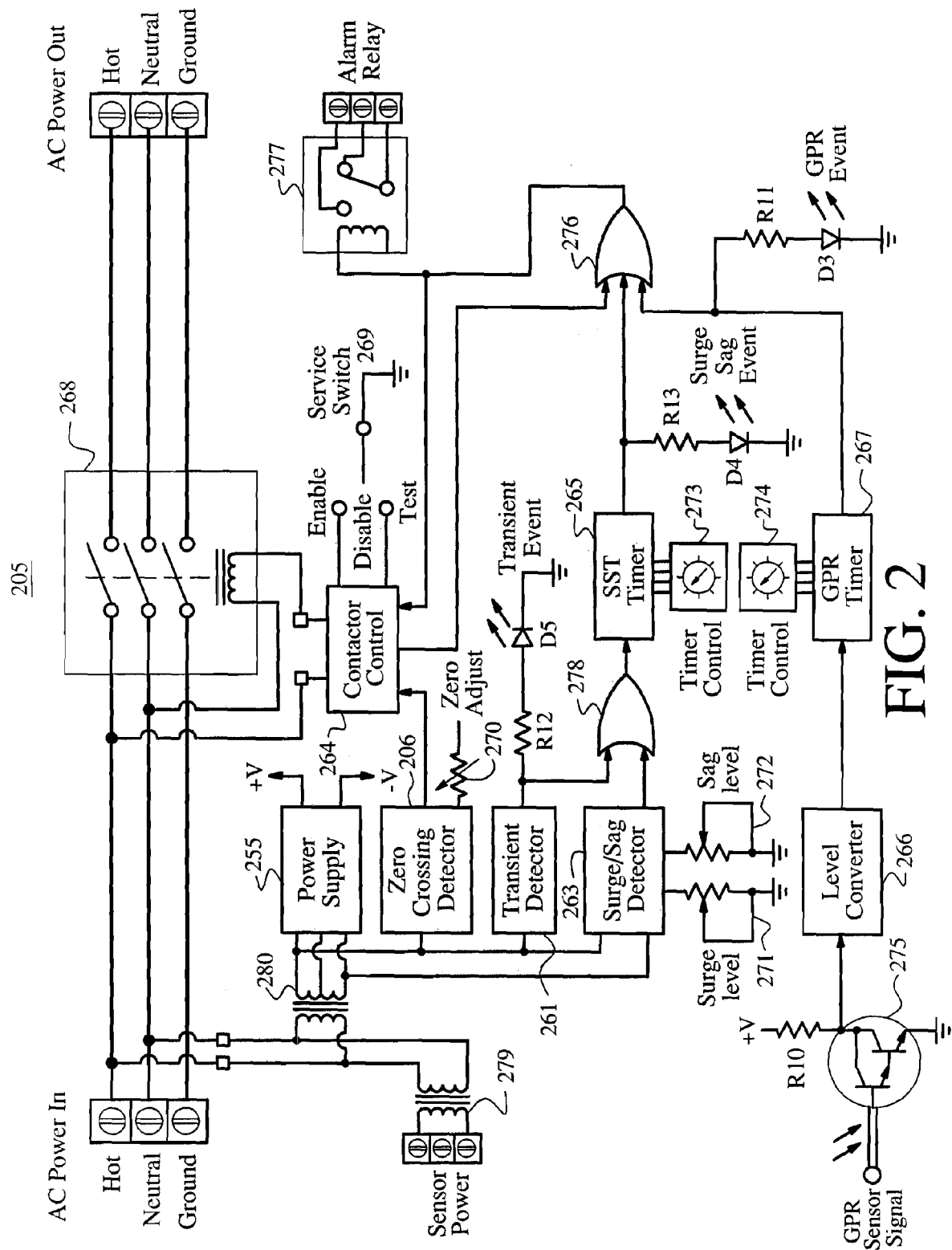
FIG. 2 shows a block diagram of an embodiment of a controller that may be employed in communication with the sensor of FIG. 1.

FIG. 2 shows a block diagram of an embodiment of controller 205, which may be employed in communication with sensor 100 of FIG. 1. Controller 205 includes contactor 268, contactor control block 264, transformers 279 and 280, power supply 255, service switch 269, switch 277, zero-crossing detector 206, adjustable resistor 270, transient detector 261, resistors R10-R13, LEDs D3-D5, OR gates 276 and 278, surge/sag detector 262, potentiometers 271 and 272, SST (sag, surge, transient) timer 265, timer control blocks 273 and 274, Darlington 275, level converter 266, and GPR timer 267.

Controller 205 provides processing of the GPR sensor optic signal and detection circuits for power line fluctuations such as power surge, power sag and power line transients. When any of the detected events occurs, contactor 268—which carries the AC power—is opened. This breaks the conduction path for damaging GPR and AC transient conditions. In one embodiment, contactor 268 is re-closed after a user-adjustable period. The timing of the re-closure is done in such a way as to occur only at power line zero crossings (for single phase applications). This minimizes the inrush currents which can stress components unnecessarily.

In one embodiment, zero-crossing detector 206 uses the AC power line signal into a window detector which has a small window at 0 volts. Each time the AC signal passes through the zero voltage level, approximately every 8.3 mS in one embodiment, a monostable multivibrator (MM) (not shown) in zero-crossing detector 206 is triggered. The positive edge MM output clocks a D-Flip Flop (not shown) in zero-crossing detector 206 which is qualified by the status of the time delayed detection signal. This has the net result of ensuring the contactor re-closure occurs in reference to the ac power phase. MM output timing is adjusted through a potentiometer such that the relay closure occurs on a subsequent zero crossing. In one embodiment, since the contactor closing timing delay is about 30 mS the MM output timing is set to make the contactor re-closure occur on the 4th zero crossing after the event timer has timed out. In other embodiments, the contactor closing is set to occur on a different zero crossing than the fourth zero-crossing. Further, in some embodiments, the contactor closing timing delay is user-adjustable so that the zero crossing on which the contactor closing occurs is user-adjustable.

In other embodiments, rather than triggering the MM on both the positive zero crossings and the negative crossings, the MM is triggered on the positive zero crossings but not the negative zero crossings, or on the negative zero-crossings but not the positive zero crossings.

In one embodiment, surge and sag detection is performed by surge/sag detector 262 using a reverse window detector. The surge/sage detection responds to signals that are higher than a specified level or lower than a specified level. In one embodiment, these levels are user-adjustable with separate controls using potentiometers 271 and 272. Within surge-sag detector 262, the AC power signal is rectified with a full wave bridge and low pass filtered to provide amplitude envelope detection. This amplitude detection signal is then measured by the reverse window detector in surge/sag detector 262. Detection of levels outside of the threshold levels will occur within 33 mS or 2 AC cycles in one embodiment.

In one embodiment, power line transients, characterized by much faster occurring spike events, will also be detected. This is done through a separate reverse window detector in transient detector 261. In one embodiment, amplitude envelope detection is not used in this process as it has the negative effect of filtering out the phenomena being detected. In one embodiment, a reduced version of the AC power signal can be sent to a reverse window detector directly.

In one embodiment, transient detector 261 provides power transient detection on the combined signal including the AC signal combined with any transients. In other embodiments, transient detector 261 includes a band-pass filter or high-pass filter to filter out the 60 Hz AC signal and performs transient detection on the filtered signal.

In one embodiment, the transient and surge/sag detector outputs are combined using OR logic (e.g. by OR gate 278) and use the same timer (SST timer 265). The SST and GPR timer outputs are then combined using OR logic (e.g. logic gate 276) to drive contactor control block 264 as well as the alarm relay (277).

If a sag, surge, or transient event occurs, SST timer 265 is started. If another sag, surge, or transient event occurs, SST timer 265 is reset. Until the timer expires, contactor 268 (which carries the AC power) will not be closed. In one embodiment, SST 265 timer is user-adjustable for a period of zero to fifteen seconds. In other embodiments, a different user-adjustable period may be employed for SST timer 265.

Similarly, if a GPR event occurs, GPR 267 timer is started. If another GPR event occurs, GPR timer 267 is reset. Until the timer expires, contactor 268 will not be closed. In one embodiment, the GPR timer is user-adjustable for a period of zero to fifteen minutes. In other embodiments, a different user-adjustable period may be employed for GPR timer 267.

In one embodiment, a service switch (269) is provides two modes for contactor 268, normal mode and service mode. The normal mode is the normal operation mode where the contactor is opened on GPR or SST events. The service mode keeps the contactor in the closed position, allowing removal of control circuits for field replacement without disrupting the power flow to the equipment.

Although a particular embodiment of controller 205 is described above, many alternative embodiments are within the scope and spirit of the invention. For example, as previously described, in some embodiments, the GPR sensor signal may be electrical rather than optical. Also, controller 205 many have more or less components than shown in FIG. 2. For example, most of the features provided by the embodiment illustrated in FIG. 2 are optional features that are not included in all embodiments of FIG. 2. For example, in one embodiment, the zero-crossing detection, the transient detection, and surge/sage protection, the adjustability of the timers, and the service switch are not included in controller 205.

Figure 3:
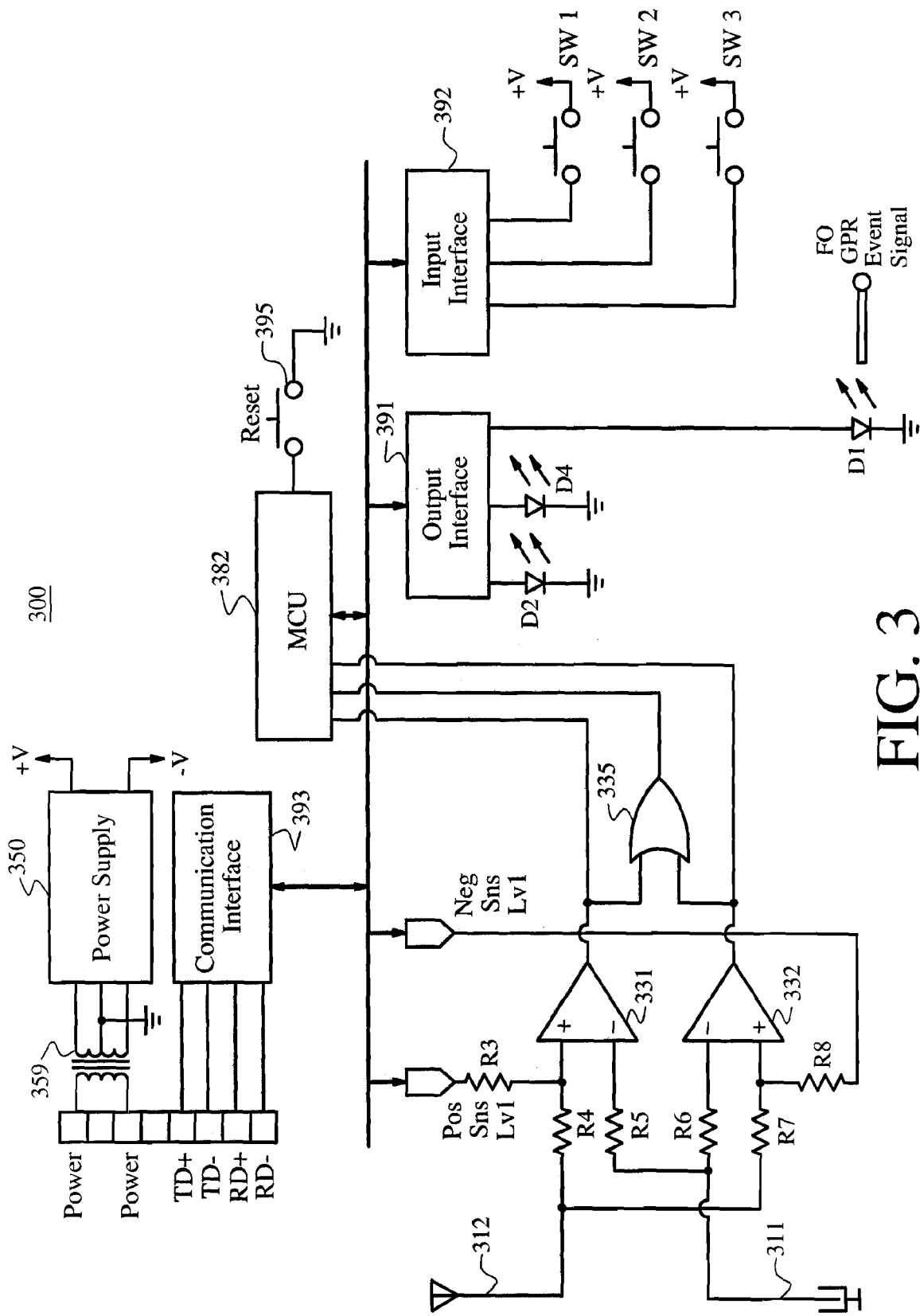
FIG. 3 illustrates a block diagram of an embodiment of the sensor of FIG. 1.
Figure 4:
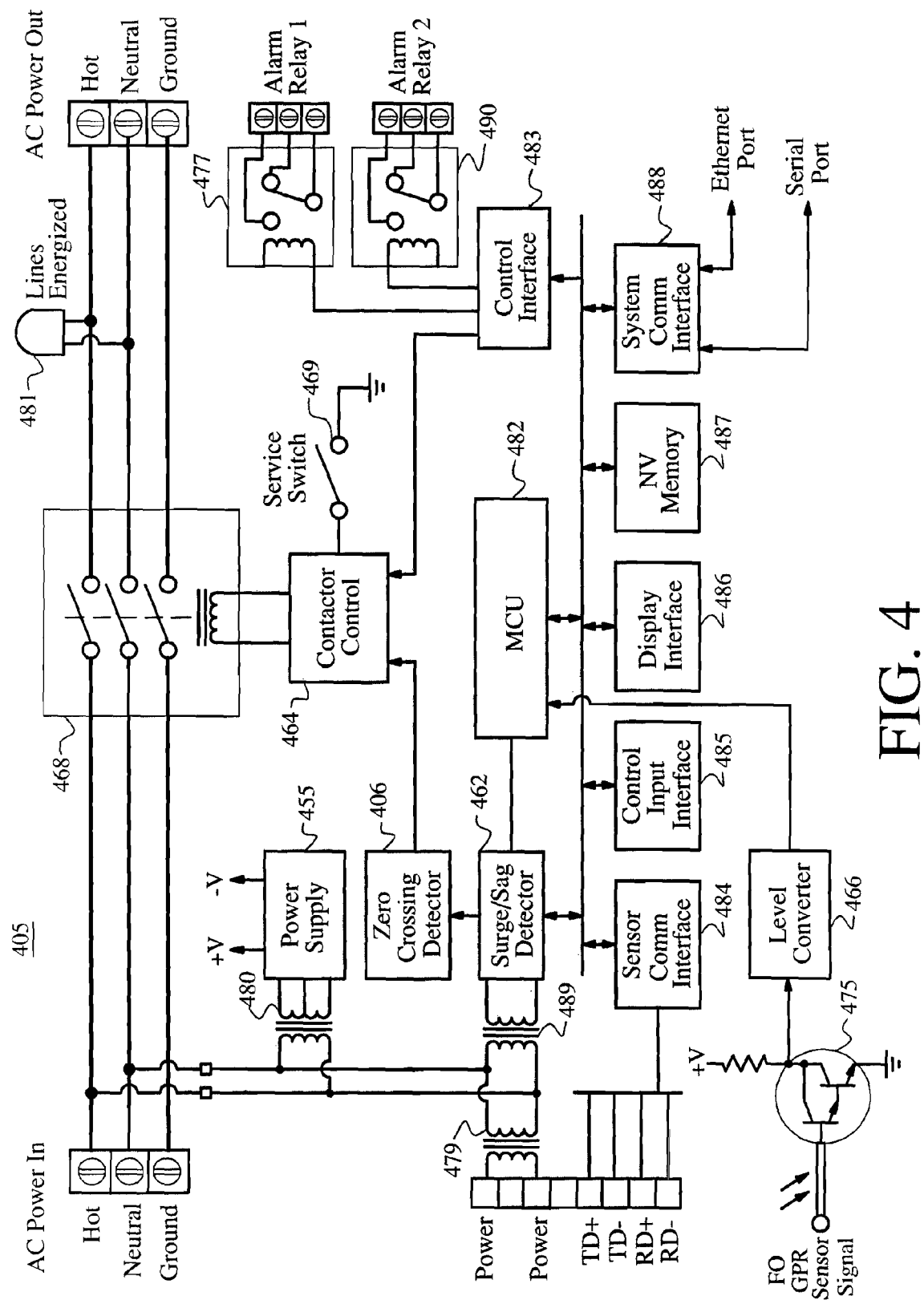
FIG. 4 shows a block diagram of an embodiment of the controller of FIG. 2.

In one embodiment, the sensor and controller may be configured for remote management. FIG. 3 and FIG. 4 illustrate embodiments of a sensor and a controller, respectively, which are configured for remote management.

FIG. 3 illustrates a block diagram of an embodiment sensor 300, which may be employed as an embodiment of sensor 100 of FIG. 1. Sensor 300 further includes microcontroller (MCU) 382, output interface 391, input interface 392, communication interface 393, reset switch 395, LED D4, and switches SW1-SW3. Communication interface 393 is configured for communication with the controller (e.g. controller 405 of FIG. 4). Communication between various sub-components of sensor 300 is accomplished via a bus. MCU 382 may be used to control the positive and negative sense levels for the window comparator.

FIG. 4 shows a block diagram of an embodiment of the controller 405, which may be employed as an embodiment of controller 205 of FIG. 2. Controller 405 further includes AND gate 481, transformer 489, control interface 483, switch 490, sensor comm interface 484, control input interface 485, display interface 486, non-volatile (NV) memory 487, and system comm interface 488. A user may interact with controller 405 through control input interface 485, or remotely through system comm interface 488. Sensor comm interface 488 is in communication with communication interface 393 of sensor 300 of FIG. 3.

In one embodiment, a copper-based medium may be used for communication between sensor 300 and controller 405. In other embodiments, fiber optic cable may be used instead of copper in order to minimize potential damage due to lightning events.

One particular embodiment uses fiber optic cables as follows. Two separate optic fiber cables are used, one fiber containing serial communication data from controller 405 to sensor 300, and the other to carry serial communication data from sensor 300 to controller 405 as well as a GPR event. The data communication from sensor 300 to controller 405 occurs only in response to polling from controller 405. If the sensor 300 detects a GPR event, the fiber is illuminated for a short period of time. Controller 405 interprets that as a GPR detection event since it was not in response to a poll from the Controller. In this embodiment, one fiber is used for two purposes without affecting response time to a GPR detection event.

In one embodiment, the remote sensor interface allows for features such as those included in the following non-limiting and non-exhaustive list:

Remote sensitivity adjustments of GPR, Surge, Sag threshold detect levels
Remote activation for system testing
Remote setting of timers
Remote reset of contactor
Event logging with time/date stamp
Events recognized:

| | |
|---|---|
| Power On | Power Off |
| Power Surge | Power Sag |
| GPR Detect | |
| Parameter change (such as timer duration, sensitivity) | |
| Line Transient Detect | |

Figure 5:
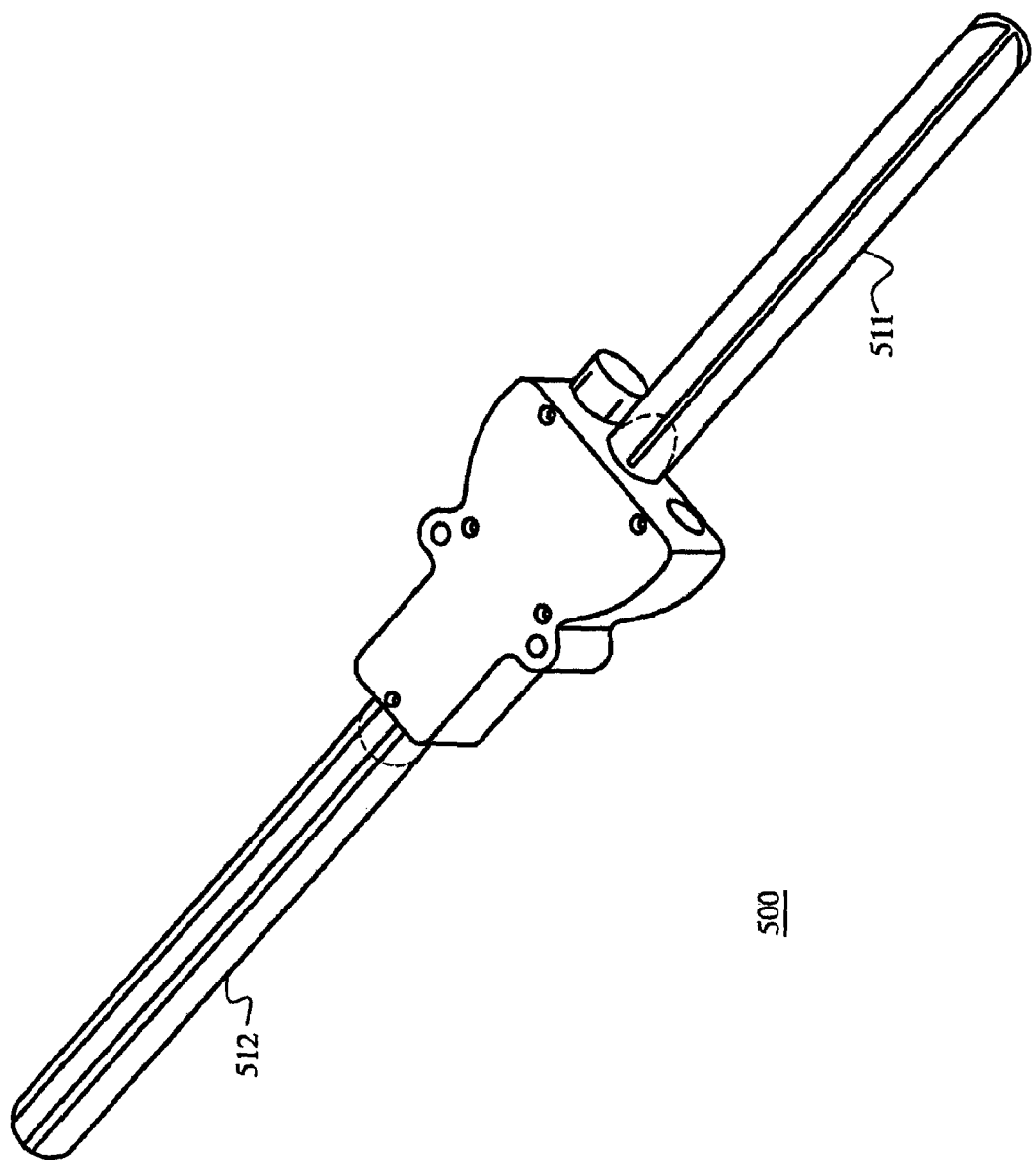
FIG. 5 illustrates an embodiment of the lightning sensor of FIG. 1, arranged in accordance with aspects of the invention.

Event log stored in non-volatile memory (saved during power failures)
Remote access to event log
Self diagnostics FIG. 5 illustrates an embodiment of lightning sensor 500, which is an embodiment of lightning sensor 100 of FIG. 1. In one embodiment, upper field coupler 512 and lower field couplers 511 are made of a metal material, such as an aluminum extrusion. In another embodiment, field couplers 511 and 512 are made of a material other than aluminum. In one embodiment, although the invention is not so limited, upper field coupler 512 and lower field coupler 511 are shaped to have a relatively high surface area. For example, in one embodiment, field couplers and 511 and 512 have a plurality of aluminum protrusions as illustrated in FIG. 5, which creates a larger surface area over tubular or rectangular geometries. In other embodiments, the specific field couplers 511 and 512 illustrated in FIG. 5 may be replaced with various designs and geometries so as to accommodate varied and specific applications. For example, other geometries may be use for the field couplers that are not based on maximizing surface area.

Although particular embodiments are described above by way of example and illustrations, other embodiments of the invention can be made without departing from the spirit and scope of the invention.

What is claimed is:

1. A lightning protection device, comprising:
    a first field coupler that is configured to be capacitively coupled to the earth ground;
    a second field coupler that is configured to be coupled to an atmospheric electric field;
    a lightning sensor that coupled to the first and second field couplers, wherein the lightning sensor is arranged to detect at least a ground potential rise, and wherein the lightning sensor includes a differential voltage window comparator; and
    a controller that is coupled to the lightning sensor, wherein the controller is arranged to provide power line isolation at least if a ground potential rise is detected by the lightning sensor.

2. The lightning protection device of claim 1, wherein the differential voltage window comparator is arranged such that the differential voltage window comparator has an adjustable voltage window.

3. The lightning protection device of claim 1, wherein the controller is arranged to provide power line isolation by disconnecting phase, neutral and ground wires at least if a ground potential rise is detected by the lightning sensor.

4. The lightning protection device of claim 1, wherein the first field coupler has at least a plurality of protrusions shaped such that the protrusions increase the surface area of the first field coupler.

5. The lightning protection device of claim 1, wherein the second field coupler has at least a plurality of protrusions shaped such that the protrusions increase the surface area of the second field coupler.

6. The lightning protection device of claim 1, wherein the first field coupler includes aluminum, the second field coupler includes aluminum, the first field coupler has at least a plurality of aluminum protrusions shaped such that the aluminum protrusions of the first field coupler increase the surface area of the first field coupler, and wherein the second field coupler has at least a plurality of aluminum protrusions shaped such that the aluminum protrusions of the second field coupler increase the surface area of the second field coupler.

7. The lightning protection device of claim 1, wherein the controller is further arranged to detect power line transients, and to also provide power line isolation if a power line transient is detected.

8. The lightning protection device of claim 1, wherein the lightning sensor further includes a low pass filter at an input of the differential voltage window comparator.

9. The lightning protection device of claim 1, wherein the lightning sensor is configured to detect both imminent positive lightning strokes and imminent negative lightning strokes.

10. The lightning protection device of claim 1, wherein the differential voltage window comparator includes a first input that is coupled to the first field coupler, a second input that is coupled to the second field coupler, and an output, wherein the differential voltage window comparator is arranged to provide an output signal such that the output signal is asserted if a differential voltage between a first voltage at the first input of the differential voltage window comparator and second voltage at the second input of the differential voltage window comparator is outside of a voltage window.

11. The lightning protection device of claim 1, wherein the controller includes:
    a power surge/sag detector circuit that is arranged to detect power sag events and power surge events;
    a power line transient circuit that is arranged to detect power line transient events;
    a contactor controller circuit that is arranged to control opening and closing a contactor, such that the contactor controller circuit controls the contactor to disconnect phase, neutral and ground wires if a ground potential rise event, a power sag event, a power surge event, or a power line transient event is detected; and
    a zero-crossing detector that is coupled to the contactor controller circuit, wherein the zero-crossing arranged to detect zero crossings of alternating current (AC) input power to ensure that contactor re-closure occurs in reference to a phase of the AC input power.

12. The lightning protection device of claim 1, wherein the differential voltage window comparator includes:
    a first comparator having at least a first input, a second input, and an output;
    a second comparator having at least a first input, a second input, and an output;
    a first resistor that is coupled between the second field coupler and the first input of the first comparator;
    a second resistor that is coupled between a negative threshold voltage node and the first input of the first comparator;
    a first low-pass filter that is coupled between first field coupler and the second input of the first comparator;
    a second low-pass filter that is coupled between the first field coupler and the second input of the second comparator;
    a third resistor that is coupled between the second field coupler and the first input of the second comparator;
    a fourth resistor that is coupled between a positive threshold voltage node and the first input of the second comparator; and
    a logic gate having at least a first input, a second input, and an output, wherein the first input of the logic gate is coupled to the output of the first comparator, and wherein the second input of the logic gate is coupled to the output of the second comparator.

13. The lightning protection device of claim 12, further comprising a threshold voltage circuit that is arranged to provide a positive threshold voltage at the positive threshold voltage node, and to provide a negative threshold voltage at the negative threshold voltage node.

14. The lightning protection device of claim 1, wherein the lightning sensor is arranged such that the detection of a ground potential rise includes detecting electrostatic waves propagated through the earth.

15. The lightning protection device of claim 1, wherein the lightning sensor is arranged such that the detection of a ground potential rise includes detecting electrostatic waves in the local atmosphere.

16. A method for lightning protection, comprising:
    employing a voltage window comparator to detect ground potential rise events; and providing power line isolation at least if a ground potential rise event is detected, wherein detecting ground potential rise events includes:

comparing a first voltage capacitively coupled from the earth ground with a second voltage coupled to the local atmospheric electric field.

17. The method of claim 16, wherein providing power line isolation includes disconnecting phase, neutral and ground wires at least if a ground potential rise event is detected.

18. The method of claim 16, wherein detecting ground potential rise events includes:

detecting electrostatic waves propagated through the earth.

19. The method of claim 16, wherein detecting ground potential rise events includes:

detecting electrostatic waves in the local atmospheric electric field.

20. The method of claim 16, wherein comparing the first voltage with the second voltage includes determining whether a difference between the first voltage and the second voltage is within a voltage window, wherein the voltage window is adjustable.

21. A lightning protection device, comprising:

means for voltage window comparison to detect ground potential rise events; and means for providing power line isolation at least if a ground potential rise event is detected, wherein detecting ground potential rise events includes:

comparing a first voltage coupled from the earth ground with a second voltage coupled to the local atmospheric electric field.

22. A method for lightning protection, comprising:

employing a voltage window comparator to detect ground potential rise events, wherein detecting ground potential rise events includes: comparing a first voltage coupled from the earth ground with a second voltage coupled to the local atmospheric electric field; and providing power line isolation at least if a ground potential rise event is detected.

23. The method of claim 22, wherein detecting ground potential rise events includes:

detecting electrostatic waves propagated through the earth.

24. The method of claim 22, wherein detecting ground potential rise events includes:

detecting electrostatic waves in the local atmospheric electric field.

* * * * *